US012743845B2

(12) United States Patent
Ahn et al.

(10) Patent No.: US 12,743,845 B2
(45) Date of Patent: Sep. 22, 2026

(54) AUTOMATED METHOD FOR GENERATING PROTHESIS FROM THREE DIMENSIONAL SCAN DATA AND COMPUTER READABLE MEDIUM HAVING PROGRAM FOR PERFORMING THE METHOD

(71) Applicant: IMAGOWORKS INC., Seoul (KR)

(72) Inventors: Junseong Ahn, Seoul (KR); So Jeong Cheon, Seoul (KR); Seong Jun Tak, Seoul (KR); Bonjour Shin, Seoul (KR); Dong Uk Kam, Seoul (KR); Jung-Min Hwang, Seoul (KR); Jeonghwa Kim, Seoul (KR); Taeseok Lee, Seongnam-si (KR); Jinhyeok Choi, Seongnam-si (KR)

(73) Assignee: IMAGOWORKS INC., Seoul (KR)

( * ) Notice: Subject to any disclaimer, the term of this patent is extended or adjusted under 35 U.S.C. 154(b) by 265 days.

(21) Appl. No.: 18/447,444

(22) Filed: Aug. 10, 2023

(65) Prior Publication Data

US 2024/0070980 A1 Feb. 29, 2024

(30) Foreign Application Priority Data

Aug. 25, 2022 (KR) ........................ 10-2022-0106978

(51) Int. Cl.
*G06T 17/00* (2006.01)
*G06T 19/20* (2011.01)

(52) U.S. Cl.
CPC .............. *G06T 17/00* (2013.01); *G06T 19/20* (2013.01); *G06T 2210/41* (2013.01); *G06T 2219/2004* (2013.01); *G06T 2219/2021* (2013.01)

(58) Field of Classification Search
None
See application file for complete search history.

(56) References Cited

U.S. PATENT DOCUMENTS 10,776,533 B2 9/2020 Fisker et al.
2009/0248184 A1 10/2009 Steingart et al.
2013/0179126 A1* 7/2013 Meier ................ A61C 13/0004 703/1
2017/0169562 A1* 6/2017 Somasundaram ..... G06V 10/26
(Continued)

FOREIGN PATENT DOCUMENTS

KR 20100127491 A 12/2010
KR 20100128101 A 12/2010
(Continued)

OTHER PUBLICATIONS

Sukun Tian, Miaohui Wang, Ning Dai, Haifeng Ma, Linlin Li, Luca Fiorenza, Yuchun Sun, Yangmin Li, "DCPR-GAN: Dental Crown Prosthesis Restoration Using Two-Stage Generative Adversarial Networks", Oct. 12, 2021, IEEE, IEEE Journal of Biomedical and Health Informatics, vol. 26, Issue: 1, pp. 151-160.*
(Continued)

*Primary Examiner* — Robert Bader
(74) *Attorney, Agent, or Firm* — LEEPI

(57) ABSTRACT

An automated method for generating a prosthesis from a 3D scan data, the method includes automatically extracting tooth information of a tooth included in the 3D scan data from the 3D scan data, automatically extracting a margin line of a prepared tooth, generating a plurality of two dimensional ("2D") images including the prepared tooth and an adjacent tooth adjacent to the prepared tooth, automatically generating a 3D temporary prosthesis data based on the plurality of 2D images and deforming a single tooth model corresponding to the prepared tooth using the margin line and the 3D temporary prosthesis data to generate a 3D prosthesis data.

12 Claims, 8 Drawing Sheets

(56) References Cited

U.S. PATENT DOCUMENTS

| | | | | |
|---|---|---|---|---|
| 2018/0028294 | A1 | 2/2018 | Azernikov et al. | |
| 2019/0282344 | A1 | 9/2019 | Azernikov et al. | |
| 2021/0059796 | A1 | 3/2021 | Weiss et al. | |
| 2025/0064562 | A1* | 2/2025 | Hollenbeck ........ | A61C 13/0004 |

FOREIGN PATENT DOCUMENTS

| | | | |
|---|---|---|---|
| KR | 20190063718 | A | 6/2019 |
| KR | 102138921 | B1 | 7/2020 |
| KR | 20210146154 | A | 12/2021 |
| KR | 20220005250 | A | 1/2022 |
| KR | 20220034210 | A | 3/2022 |
| KR | 20220104036 | A | 7/2022 |

OTHER PUBLICATIONS

Sukun Tian, Miaohui Wang, Fulai Yuan, Ning Dai, Yuchun Sun, Wuyuan Xie, Jing Qin, “Efficient Computer-Aided Design of Dental Inlay Restoration: A Deep Adversarial Framework”, May 4, 2021, IEEE, IEEE Transactions on Medical Imaging, vol. 40, Issue: 9, pp. 2415-2427.*

Sukun Tian, Miaohui Wang, Haifeng Ma, Pan Huang, Ning Dai, Yuchun Sun, Jianjun Meng, “Efficient tooth gingival margin line reconstruction via adversarial learning”, Jul. 19, 2022, Elsevier, Biomedical Signal Processing and Control, vol. 78, pp. 1-12.*

Xiaotong Jiang, Ning Dai, Xiaosheng Cheng, Jun Wang, Qingjin Peng, Hao Liu, Cheng Cheng, “Robust tooth surface reconstruction by iterative deformation”, Nov. 14, 2015, Elsevier, Biomedical Signal Processing and Control, vol. 68, pp. 1-11.*

Jane Wihelms, Judy Challinger, Naim Alper, Shankar Ramamoorthy, Arsi Vaziri, “Direct vol. Rendering of Curvilinear Volumes”, Nov. 1, 1990, ACM, ACM SIGGRAPH Computer Graphics, vol. 24, Issue 5, pp. 41-47.*

Tillmann Steinbrecher, Maik Gerth, “Dental Inlay and Onlay Construction by Iterative Laplacian Surface Editing”, Sep. 29, 2008, Eurographics, Computer Graphics Forum, vol. 27, Issue 5, pp. 1441-1447.*

Extended European Search Report issued on Feb. 6, 2024.

International Search Report issued on Jun. 2, 2023.

* cited by examiner y_local
z_local
x_local
y_world
z_world
x_world

AUTOMATED METHOD FOR GENERATING PROTHESIS FROM THREE DIMENSIONAL SCAN DATA AND COMPUTER READABLE MEDIUM HAVING PROGRAM FOR PERFORMING THE METHOD

PRIORITY STATEMENT

This application claims priority under 35 U.S.C. § 119 to Korean Patent Application No. 10-2022-0106978, filed on Aug. 25, 2022 in the Korean Intellectual Property Office (KIPO) and International Patent Application No. PCT/KR2022/013149 filed on Sep. 1, 2022, the contents of which are herein incorporated by reference in their entireties.

BACKGROUND

1. Technical Field

Embodiments relate to an automated method for generating a prosthesis from a three dimensional ("3D") scan data and a non-transitory computer-readable storage medium having stored thereon program instructions of the automated method for generating the prosthesis. More particularly, embodiments relate to an automated method for generating a prosthesis from a 3D scan data reducing a time and processes for generating the prosthesis and enhancing a quality of the prosthesis and a non-transitory computer-readable storage medium having stored thereon program instructions of the automated method for generating the prosthesis.

2. Description of the Related Art

A three dimensional ("3D") oral scan data refers to a scanned data of teeth and oral cavity by a 3D scanner, or a scanned data of an impression object or a reconstructed object of the teeth and the oral cavity by the 3D scanner. In prosthetic treatment such as in-ray, on-ray, and crown, dental treatment such as implant and orthodontic treatment, oral data of the patient may be acquired and be used to design prosthesis or implant, braces.

Conventionally, a method of generating a prosthesis manually after taking a direct model of the teeth and the oral cavity using alginate or the like has been mainly used. In order to make an anatomically correct prosthesis, a dentist or a dental technician may determine a degree of wear on adjacent teeth, a tooth number and occlusion information of an antagonist tooth, and then generate the prosthesis. In the conventional prosthesis generating method, an operator may manually modify a general tooth shape according to the oral condition of each patient in consideration of the above information.

Conventionally, the prosthesis may be generated manually, work fatigue of the dentist or the dental technician may increase and accuracy and productivity of the prosthesis may decrease. In addition, the quality of the prosthesis and the time for generating the prosthesis may vary greatly depending on the proficiency of the operator.

SUMMARY

Embodiments provide an automated method for generating a prosthesis from a three dimensional ("3D") scan data reducing a time and processes for generating the prosthesis and enhancing a quality of the prosthesis.

Embodiments provide a non-transitory computer-readable storage medium having stored thereon program instructions of the automated method for generating a prosthesis from a 3D scan data.

In an example automated method for generating a prosthesis from a 3D scan data according to the present inventive concept, the method includes automatically extracting tooth information of a tooth included in the 3D scan data from the 3D scan data, automatically extracting a margin line of a prepared tooth, generating a plurality of two dimensional ("2D") images including the prepared tooth and an adjacent tooth adjacent to the prepared tooth, automatically generating a 3D temporary prosthesis data based on the plurality of 2D images and deforming a single tooth model corresponding to the prepared tooth using the margin line and the 3D temporary prosthesis data to generate a 3D prosthesis data.

In an embodiment, the tooth information may include a tooth number, whether or not the tooth is prepared, a position of the tooth, and a direction of the tooth.

In an embodiment, the automatically extracting tooth information of the tooth may include pre-processing the 3D scan data to a model input, obtaining a feature map by inputting the model input to a backbone network and extracting the tooth information from the feature map.

In an embodiment, a regression loss may be used for the position of the tooth and the direction of the tooth and a classification loss may be used for the tooth number for learning of the backbone network.

In an embodiment, the automatically extracting the margin line may include extracting a partial scan data corresponding to the prepared tooth from the 3D scan data, mapping the partial scan data into a predetermined 2D space using a transformation matrix, obtaining a 2D margin line by determining a curvature value from data mapped into the 2D space and converting the 2D margin line into a 3D margin line using an inverse matrix of the transformation matrix.

In an embodiment, the plurality of 2D images may include a first 2D image including the prepared tooth and a first adjacent tooth of the prepared tooth and a second 2D image including the prepared tooth and a second adjacent tooth of the prepared tooth.

In an embodiment, a center of the first 2D image may be the same as a center of the second 2D image. A projection direction of the first 2D image may be different from a projection direction of the second 2D image.

In an embodiment, the center of the first 2D image and the center of the second 2D image may be a center of the prepared tooth.

In an embodiment, a conditional generative adversarial network may be used in the automatically generating the 3D temporary prosthesis data.

In an embodiment, the conditional generative adversarial network may include an encoder configured to receive the plurality of 2D images, position information of a camera and direction information of the camera, a latent vector connected to the encoder and a decoder connected to the latent vector. The decoder may be configured to output the 3D temporary prosthesis data.

In an embodiment, the deforming the single tooth model may include aligning the single tooth model to a position of the prepared tooth and deforming the single tooth model using the margin line as a first constraint and using the 3D temporary prosthesis data as a second constraint.

In an embodiment, when a Laplacian matrix of the single tooth model is L, a point set of the 3D temporary prosthesis data is Ppos, a point set of the margin line is Pmargin, a constraint to be close to Ppos is Cpred, a constraint not to exceed Pmargin is Cmargin, a position of a vertex of the 3D prosthesis data is xopt, $$\begin{bmatrix} L \\ C_{pred} \\ C_{margin} \end{bmatrix} x_{opt} = \begin{bmatrix} 0 \\ P_{pos} \\ P_{margin} \end{bmatrix}$$

may be satisfied.

In an embodiment, the automated method for generating the prosthesis from the 3D scan data may further include aligning the 3D scan data to an origin of a predetermined coordinate system in directions of the predetermined coordinate system prior to the automatically extracting the tooth information.

In an embodiment, the automatically extracting the tooth information may be operated by a first artificial intelligence neural network. The automatically extracting the margin line may be operated by a second artificial intelligence neural network. The automatically generating the 3D temporary prosthesis data may be operated by a third artificial intelligence neural network.

In an example automated method for generating a prosthesis from a 3D scan data according to the present inventive concept, the method includes automatically extracting tooth information of a tooth included in the 3D scan data from the 3D scan data, determining whether a prepared tooth exists or not in the 3D scan data from the tooth information, automatically extracting a margin line of the prepared tooth when the prepared tooth exists in the 3D scan data, generating a plurality of two dimensional ("2D") images including the prepared tooth and an adjacent tooth adjacent to the prepared tooth when the prepared tooth exists in the 3D scan data, automatically generating a 3D temporary prosthesis data based on the plurality of 2D images and deforming a single tooth model corresponding to the prepared tooth using the margin line and the 3D temporary prosthesis data to generate a 3D prosthesis data.

In an example non-transitory computer-readable storage medium having stored thereon program instructions, the program instructions is executable by at least one hardware processor to automatically extract tooth information of a tooth included in a three dimensional ("3D") scan data from the 3D scan data, automatically extract a margin line of a prepared tooth, generate a plurality of two dimensional ("2D") images including the prepared tooth and an adjacent tooth adjacent to the prepared tooth, automatically generate a 3D temporary prosthesis data based on the plurality of 2D images and deform a single tooth model corresponding to the prepared tooth using the margin line and the 3D temporary prosthesis data to generate a 3D prosthesis data.

According to the automated method for generating the prosthesis from the 3D scan data, the tooth information may be automatically extracted from the 3D scan data, the margin line may be automatically extracted from the partial scan data of the prepared tooth, the 3D temporary prosthesis data may be automatically generated based on the plurality of 2D images of the prepared tooth and the adjacent teeth of the prepared tooth and the single tooth model may be automatically deformed based on the outer point information of the 3D temporary prosthesis data and the margin line to automatically generate the 3D prosthesis data.

In this way, the prosthesis may be automatically generated from the 3D scan data, so that the time and processes of generating the prosthesis may be reduced, and the quality of the prosthesis may be enhanced.

In particular, at least one of operations of automatically extracting the tooth information from the 3D scan data, automatically extracting the margin line from the partial scan data of the prepared tooth and automatically generating the 3D temporary prosthesis data is operated using an artificial intelligence neural network so that the time and processes of generating the prosthesis may be reduced, and the quality of the prosthesis may be enhanced.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE EMBODIMENTS

Figure 1:
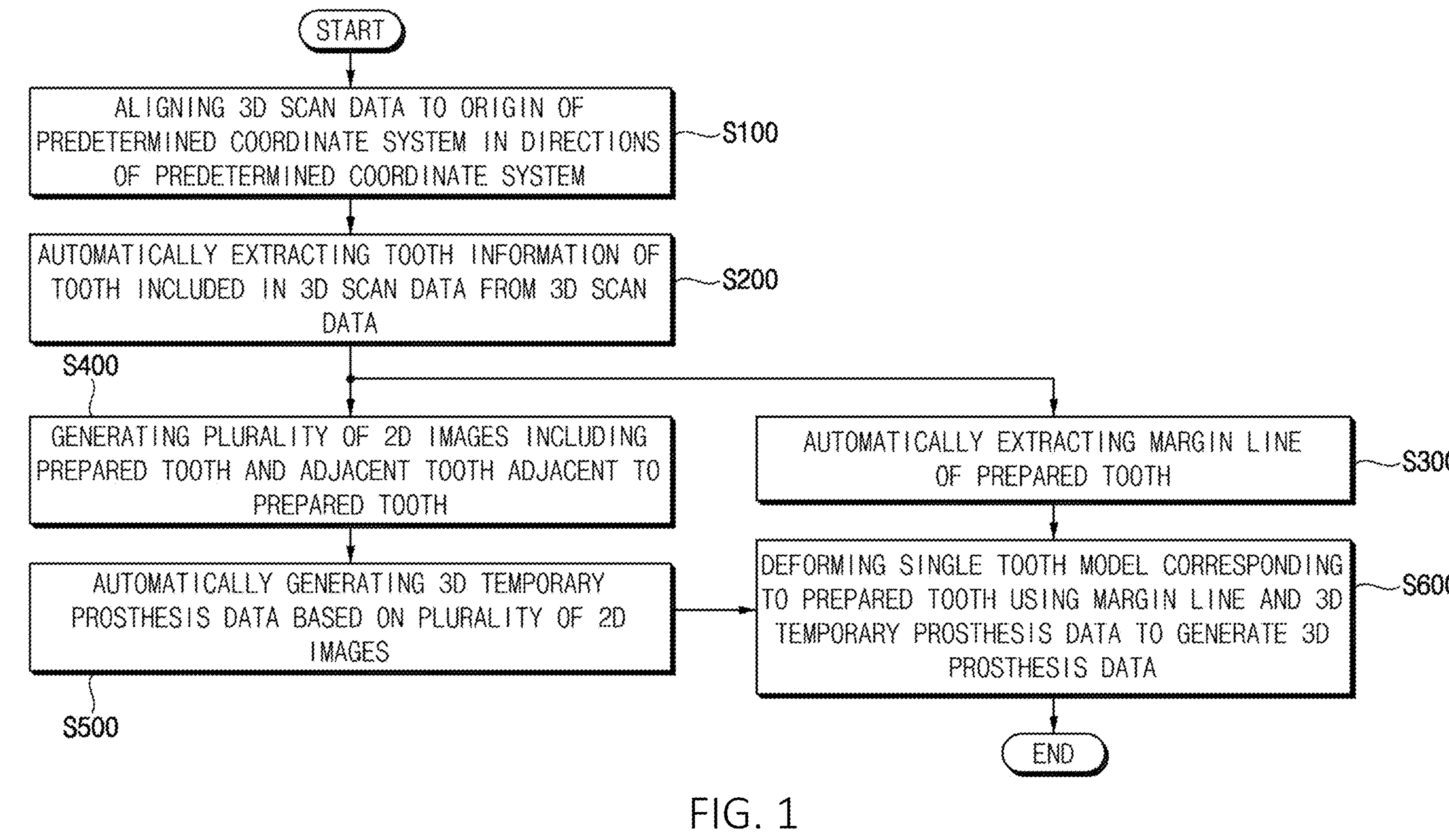
FIG. 1 is a flowchart diagram illustrating an automated method for generating a prosthesis from a three dimensional ("3D") scan data according to an embodiment of the present inventive concept.

The present inventive concept now will be described more fully hereinafter with reference to the accompanying drawings, in which embodiments of the present invention are shown. The present inventive concept may, however, be embodied in many different forms and should not be construed as limited to the embodiments set forth herein.

Rather, these embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

FIG. 1 is a flowchart diagram illustrating an automated method for generating a prosthesis from a three dimensional ("3D") scan data according to an embodiment of the present inventive concept.

Referring to FIG. 1, the automated method for generating the prosthesis from the 3D scan data according to the present embodiment includes an operation (operation S200) of automatically extracting tooth information of each tooth included in the 3D scan data from the 3D scan data, an operation (operation S300) of automatically extracting a margin line of a prepared tooth (a prepped tooth), an operation (operation S400) of generating a plurality of two dimensional ("2D") images including the prepared tooth and an adjacent tooth adjacent to the prepared tooth, an operation (operation S500) of automatically generating a 3D temporary prosthesis data based on the 2D images and an operation (operation S600) of deforming a single tooth model corresponding to the prepared tooth using the margin line and the 3D temporary prosthesis data to generate a 3D prosthesis data.

The automated method for generating the prosthesis from the 3D scan data may further include an operation (operation S100) of aligning the 3D scan data to an origin of a predetermined coordinate system in directions of the predetermined coordinate system prior to the operation (operation S200) of automatically extracting the tooth information.

Herein, the 3D scan data refers to a scanned data of teeth and oral cavity by a 3D scanner, or a scanned data of an impression object or a reconstructed object of the teeth and the oral cavity by the 3D scanner. For example, the 3D scan data may be a mesh data including 3D vertices and triangles or quadrangles generated by connecting the vertices. A file extension of the 3D scan data may not be limited. For example, the file extension of the 3D scan data may be one of ply, obj and stl.

Herein, the prepared tooth may mean a tooth prepared for a crown. The prepared tooth may mean a tooth obtained by cutting a part of the tooth.

Figures 2, 3:
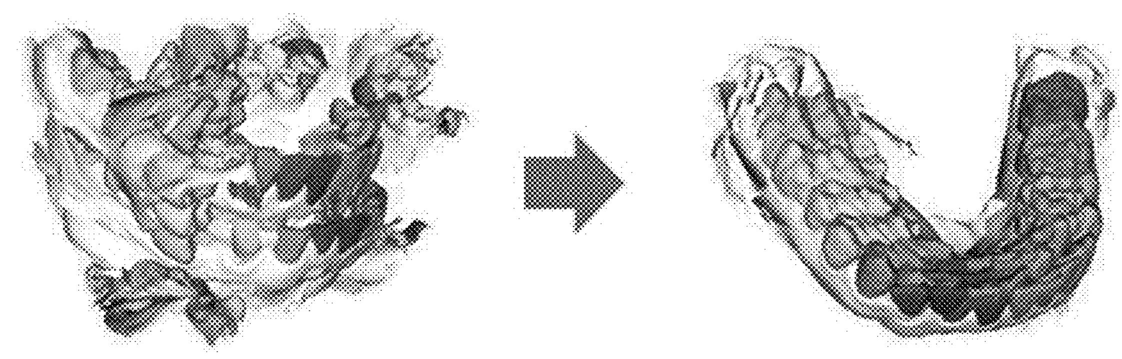
FIG. 2 is a diagram illustrating an operation of automatically aligning the 3D scan data of FIG. 1.
FIG. 3 is a diagram illustrating an operation of automatically extracting tooth information of FIG. 1.

FIG. 2 is a diagram illustrating the operation (operation S100) of automatically aligning the 3D scan data of FIG. 1.

Referring to FIGS. 1 and 2, in the operation (operation S100) of automatically aligning the 3D scan data, a normalization matrix for normalizing a position and a direction of the 3D scan data may be obtained using a PCA (a principal component analysis). When each point of the 3D scan data is multiplied by the normalization matrix, the 3D scan data may be aligned in a predetermined coordinate and a predetermined direction.

It is shown in FIG. 2 that various 3D scan data are aligned in the predetermined coordinates and the predetermined direction.

When the 3D scan data is aligned in a specific direction to a specific position, the accuracy of the prosthesis may be enhanced in the method of automatically generating the prosthesis from the 3D scan data.

Figure 4:
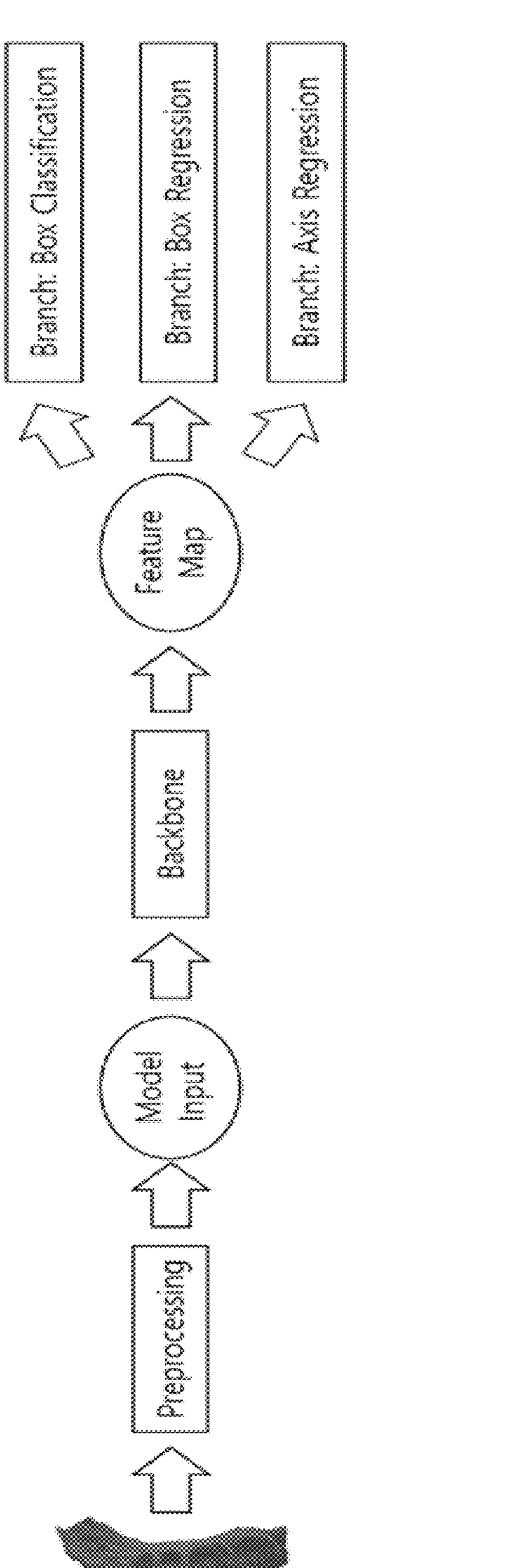
FIG. 4 is a flowchart diagram illustrating the operation of automatically extracting the tooth information of FIG. 1.

FIG. 3 is a diagram illustrating the operation (operation S200) of automatically extracting the tooth information of FIG. 1. FIG. 4 is a flowchart diagram illustrating the operation (operation S200) of automatically extracting the tooth information of FIG. 1.

Referring to FIGS. 1 to 4, the tooth information may include a tooth number, whether or not the tooth is prepared, a position of the tooth, and a direction of the tooth. For example, the position of the tooth may mean a position of a midpoint of the tooth (e.g. a midpoint of an upper surface of the tooth or a center of gravity of the tooth). For example, the direction of the tooth may include a front-back direction of the tooth, an up-down direction of the tooth and a left-right direction of the tooth.

When the number of teeth in the 3D scan data is N, a state of the teeth (the tooth number and whether or not the tooth is prepared) is expressed as class, the position of the teeth is expressed as pos, and the direction of the teeth is expressed as orient, class=$\{c_1, \ldots, c_N\}$, pos=$\{x_1, \ldots, x_N\}$ and orient=$\{\theta_1, \ldots, \theta_N\}$.

In FIG. 3, x_world, y_world, and z_world may represent directions of the predetermined coordinate system, and x_local, y_local, and z_local may represent the front-back direction of a specific tooth, the up-down direction of the specific tooth and left-right direction of the specific tooth.

For example, the operation (operation S200) may include an operation of pre-processing the 3D scan data to a model input, an operation of obtaining a feature map by inputting the model input to a backbone network and an operation of extracting the tooth information from the feature map.

By the pre-processing, the 3D scan data may be converted into a form inputted to the backbone network. For example, the model input may be a point cloud, a depth map, a parameterized mesh or a mesh with a fixed topology. For example, the model input may be a 2D image data. Alternatively, the model input may be a 3D image data.

In FIG. 4, state information of the tooth is expressed as Box Classification, position information of the tooth is expressed as Box Regression and direction information of the tooth is expressed as Axis Regression.

For learning of the backbone network, a regression loss may be used for the position and direction of the tooth, and a classification loss may be used for the tooth number.

Figure 5:
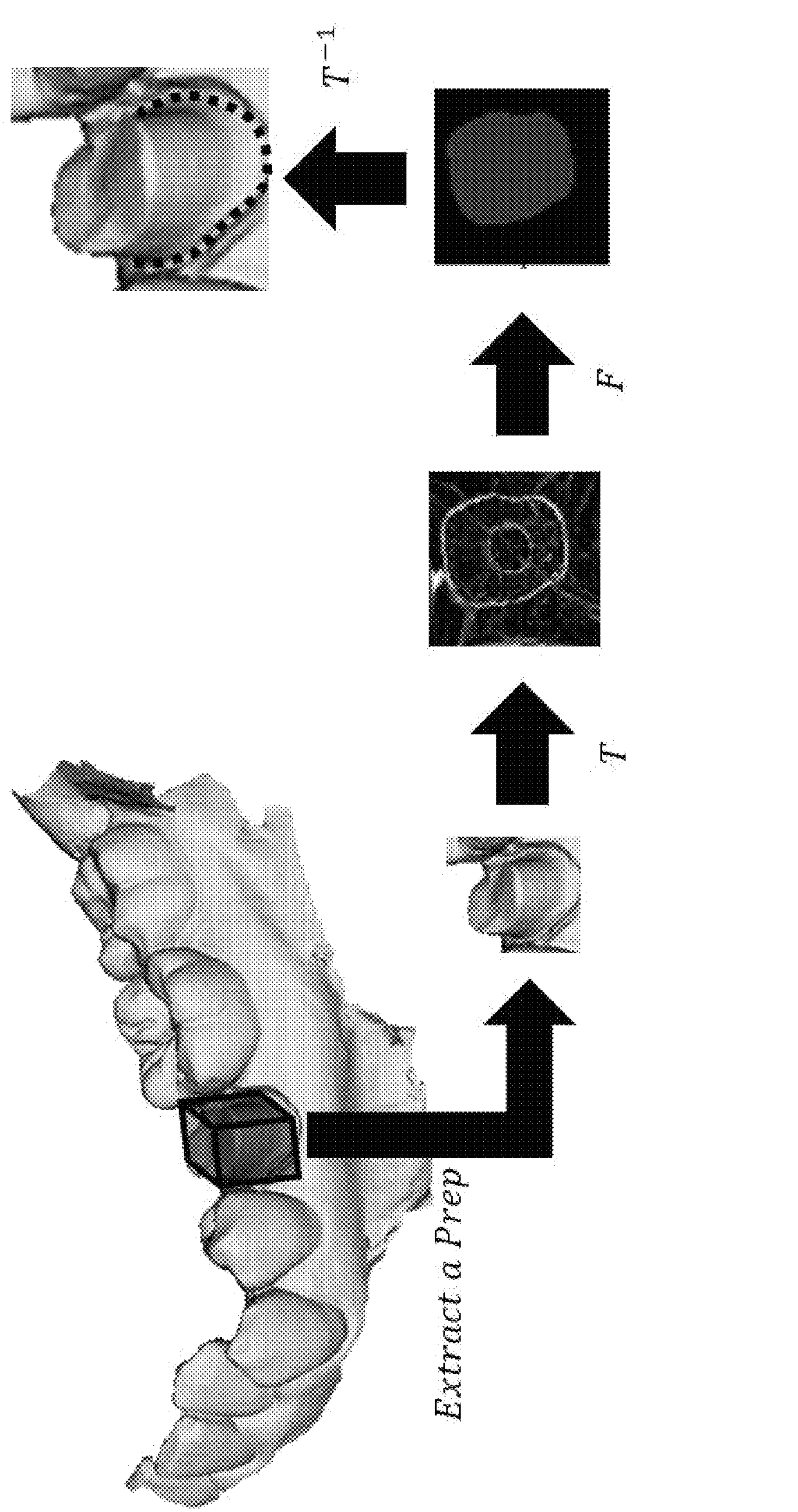
FIG. 5 is a diagram illustrating an operation of automatically extracting a margin line of FIG. 1.

FIG. 5 is a diagram illustrating the operation (operation S300) of automatically extracting the margin line of FIG. 1.

Referring to FIGS. 1 to 5, the operation (operation S300) of automatically extracting the margin line may include an operation of extracting a partial scan data corresponding to the prepared tooth from the 3D scan data, an operation of mapping the partial scan data into a predetermined 2D space using a transformation matrix T, an operation (F) of obtaining a 2D margin line by determining a curvature value from data mapped into the 2D space and an operation of converting the 2D margin line into a 3D margin line using an inverse matrix $T^{-1}$ of the transformation matrix.

For example, the curvature value may be one of a maximum curvature value, a minimum curvature value, a Gaussian curvature value and an average curvature value.

In an upper surface of the tooth, the curvature value may have a relatively constant value. On the other hand, the curvature value may greatly change at a boundary between teeth or a boundary between teeth and gums. Accordingly, the margin line of the tooth may be determined using the curvature value.

Alternatively, the 3D margin line may be directly obtained from the 3D scan data in the operation (operation S300) of automatically extracting the margin line.

Figure 6:
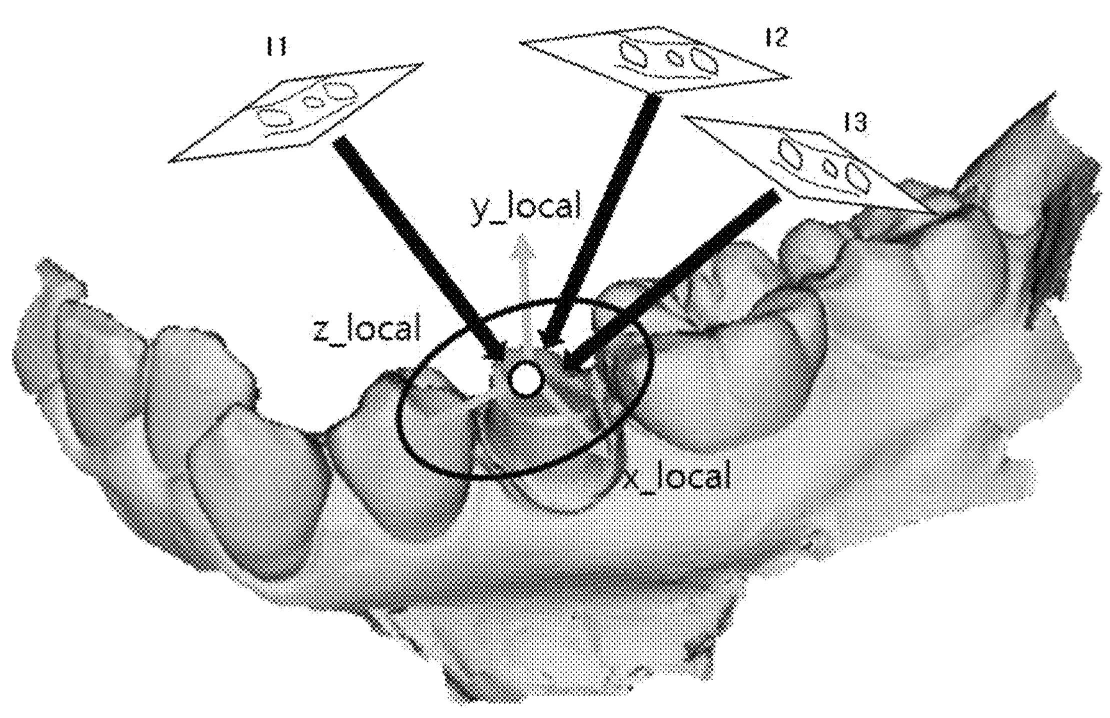
FIG. 6 is a diagram illustrating an operation of generating a plurality of two dimensional ("2D") images of FIG. 1.

FIG. 6 is a diagram illustrating the operation (operation S400) of generating the plurality of 2D images of FIG. 1.

Referring to FIGS. 1 to 6, the plurality of 2D images I1, I2 and I3 may include the prepared tooth and the adjacent tooth adjacent to the prepared tooth.

For example, the plurality of 2D images may include a first 2D image (e.g., I1) including the prepared tooth and a first adjacent tooth of the prepared tooth and a second 2D image (e.g., I3) including the prepared tooth and a second adjacent tooth of the prepared tooth. For example, a center of the first 2D image (e.g., I1) may be the same as a center of the second 2D image (e.g., I3). For example, a projection direction of the first 2D image (e.g., I1) may be different from a projection direction of the second 2D image (e.g., I3).

For example, the center of the first 2D image and the center of the second 2D image may be a center of the prepared tooth.

Although the plurality of 2D images includes three images in FIG. 6, the present inventive concept may not be limited thereto. A number of the plurality of 2D images is at least two. When the number of the plurality of 2D images is great, the accuracy of the 3D temporary prosthesis data may be enhanced.

For example, the plurality of 2D images may be image data captured by a camera of the prepared tooth and the adjacent tooth of the prepared tooth.

Figure 7:
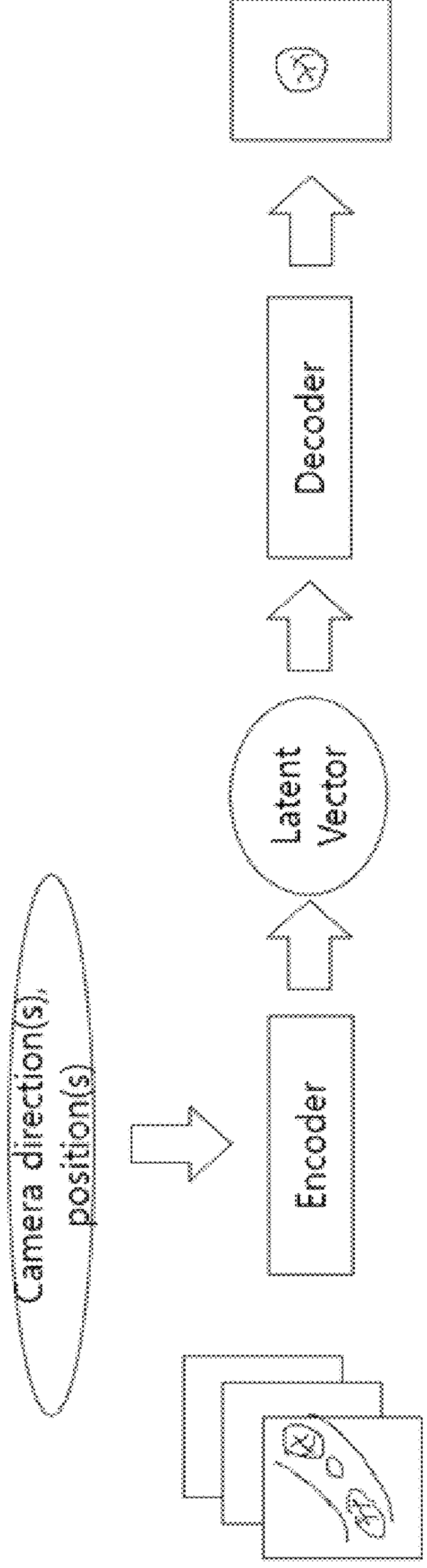
FIG. 7 is a diagram illustrating an operation of automatically generating a 3D temporary prosthesis data of FIG. 1.

FIG. 7 is a diagram illustrating the operation (operation S500) of automatically generating the 3D temporary prosthesis data of FIG. 1.

Referring to FIGS. 1 to 7, the 3D temporary prosthesis data may be automatically generated based on the plurality of 2D images I1, I2 and I3.

For example, a conditional generative adversarial network (cGAN) may be used in the operation (operation S500) of automatically generating the 3D temporary prosthesis data. The conditional generative adversarial network may include an encoder receiving the plurality of 2D images, position information of a camera generating the 2D images and direction information of the camera generating the 2D images, a latent vector connected to the encoder and a decoder connected to the latent vector. The decoder may output the 3D temporary prosthesis data.

Figure 8:
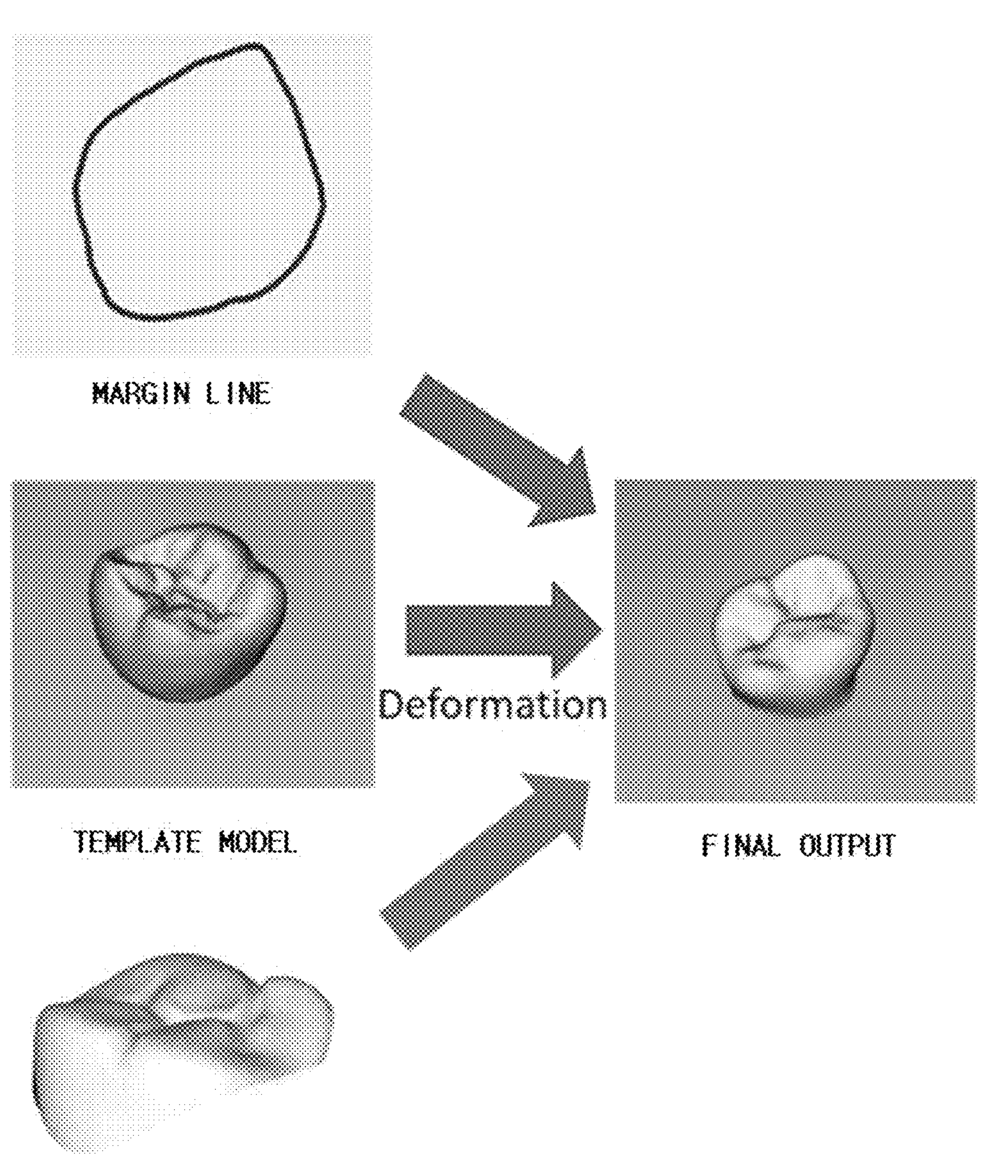
FIG. 8 is a diagram illustrating an operation of automatically generating a 3D prosthesis data of FIG. 1.

FIG. 8 is a diagram illustrating the operation (operation S600) of automatically generating the 3D prosthesis data of FIG. 1.

Referring to FIGS. 1 to 8, the single tooth model corresponding to the prepared tooth may be deformed using the margin line and the 3D temporary prosthesis data to generate the 3D prosthesis data.

For example, the single tooth model may be a template model predesigned for each tooth type (the tooth number) or may be a mesh data generated by a person such as a dental technician or a dentist.

The template model is a kind of sample tooth (a standard tooth) used to manufacture the prosthesis, an implant, a brace, and the like, and may have a typical tooth shape. The template model may have one sample tooth (the standard tooth) for each tooth number. The 3D scan data is taken by the 3D scanner, and a degree of completion of the mesh may be low. When the degree of completion of the mesh is low, a 3D printing method may be inappropriate for manufacturing the prosthesis, the implant, the brace, and the like. In contrast, the template model may be a tooth model having a relatively high degree of mesh completion. Therefore, when the prosthesis, the implant, the brace and the like are manufactured by modifying the template model, the 3D printing method may be appropriate for manufacturing the prosthesis, the implant, the brace and the like.

For example, the operation (operation S600) of generating the 3D prosthesis data includes aligning the single tooth model to the position of the prepared tooth and deforming the single tooth model using the margin line as a first constraint and using the 3D temporary prosthesis data as a second constraint.

When a Laplacian matrix of the single tooth model is L, a point set of the 3D temporary prosthesis data is Ppos, a point set of the margin line is Pmargin, a constraint to be close to Ppos is Cpred, a constraint not to exceed Pmargin is Cmargin, a position of a vertex of the 3D prosthesis data is xopt, $$\begin{bmatrix} L \\ C_{pred} \\ C_{margin} \end{bmatrix} x_{opt} = \begin{bmatrix} 0 \\ P_{pos} \\ P_{margin} \end{bmatrix}$$

may be satisfied.

When the linear equation is solved by a least square method, xopt, which is the position of the vertex of the 3D prosthesis data, may be obtained. The above constraints are used so that the 3D prosthesis data may be generated considering the antagonist tooth and the adjacent teeth and not exceeding the margin line. Thus, the generated prosthesis may be applied clinically.

The margin line information generated in the operation S300 may correspond to the margin line of a final prosthesis data. In addition, the 3D temporary prosthesis data generated in the operation S500 may correspond to a shape of an upper surface of the tooth of the final prosthesis data.

The automated method for generating the prosthesis from the 3D scan data according to the present embodiment may be operated by a computing apparatus.

For example, the operation (operation S200) of automatically extracting the tooth information may be operated by a first artificial intelligence neural network. For example, the operation (operation S300) of automatically extracting the margin line may be operated by a second artificial intelligence neural network. For example, the operation (operation S500) of automatically generating the 3D temporary prosthesis data may be operated by a third artificial intelligence neural network.

In the present invention, each operation may be automated using at least three different artificial intelligence neural networks. Therefore, the operation speed and operation accuracy may be greatly enhanced.

According to the present embodiment, the tooth information may be automatically extracted from the 3D scan data, the margin line may be automatically extracted from the partial scan data of the prepared tooth, the 3D temporary prosthesis data may be automatically generated based on the plurality of 2D images of the prepared tooth and the adjacent teeth of the prepared tooth and the single tooth model may be automatically deformed based on the outer point information of the 3D temporary prosthesis data and the margin line to automatically generate the 3D prosthesis data.

In this way, the prosthesis may be automatically generated from the 3D scan data, so that the time and processes of generating the prosthesis may be reduced, and the quality of the prosthesis may be enhanced.

In particular, at least one of operations of automatically extracting the tooth information from the 3D scan data, automatically extracting the margin line from the partial scan data of the prepared tooth and automatically generating the 3D temporary prosthesis data is operated using an artificial intelligence neural network so that the time and processes of generating the prosthesis may be reduced, and the quality of the prosthesis may be enhanced.

Figure 9:
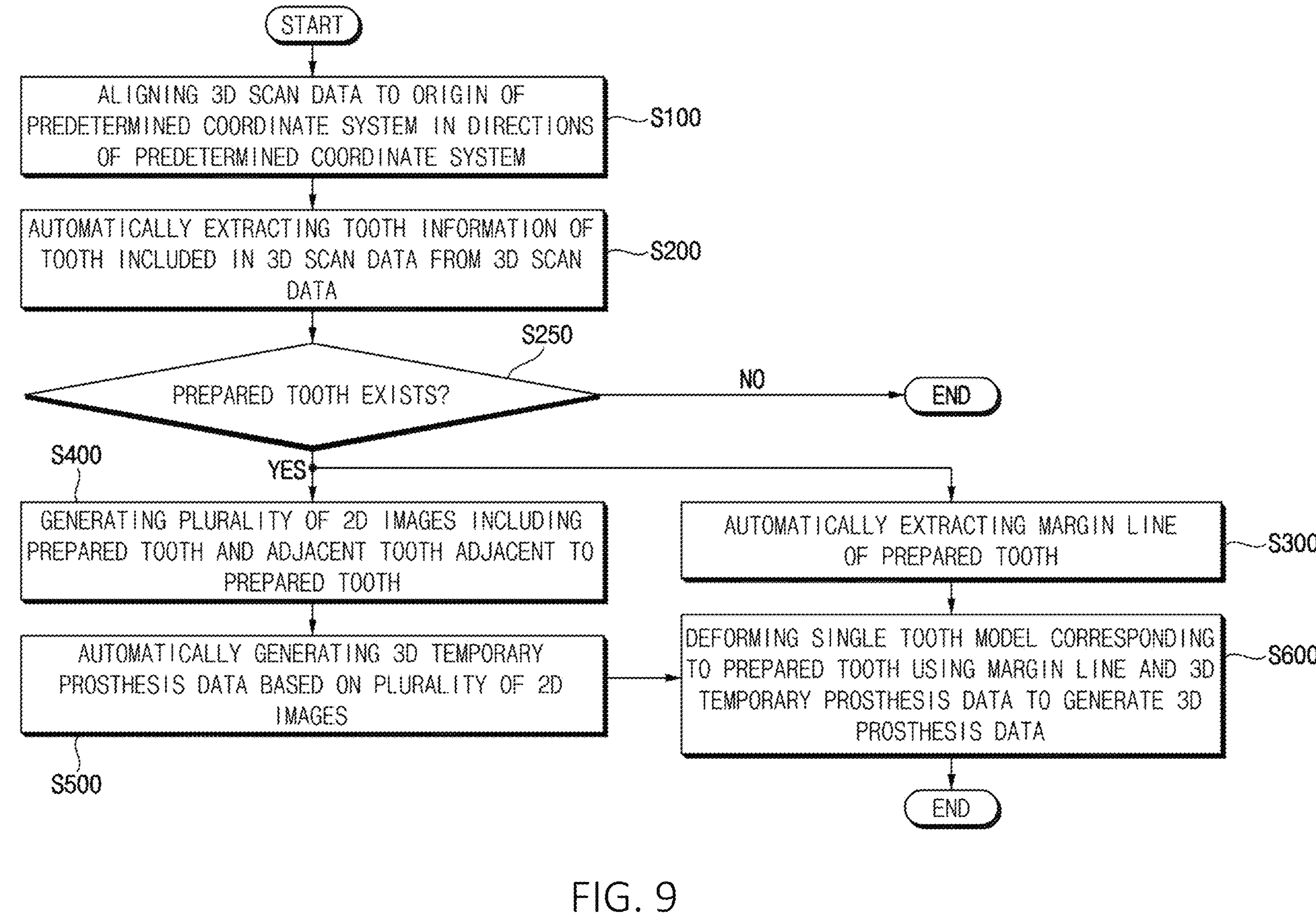
FIG. 9 is a flowchart diagram illustrating an automated method for generating a prosthesis from a 3D scan data according to an embodiment of the present inventive concept.

FIG. 9 is a flowchart diagram illustrating an automated method for generating a prosthesis from a 3D scan data according to an embodiment of the present inventive concept.

The automated method for generating the prosthesis from the 3D scan data according to the present embodiment is substantially the same as the automated method for generating the prosthesis from the 3D scan data of the previous embodiment explained referring to FIGS. 1 to 8 except that the automated method for generating the prosthesis further includes an operation of determining whether the prepared tooth exists or not. Thus, the same reference numerals will be used to refer to the same or like parts as those described in the previous exemplary embodiment of FIGS. 1 to 8 and any repetitive explanation concerning the above elements will be omitted.

Referring to FIG. 9, the 3D scan data is aligned to an origin of a predetermined coordinate system in directions of the predetermined coordinate system (operation S100).

The tooth information of each tooth included in the 3D scan data is automatically extracted from the 3D scan data (operation S200).

It is determined whether the prepared tooth exists in the 3D scan data or not from the tooth information (operation S250). When the prepared tooth does not exist in the 3D scan data, there is no reason to generate the prosthesis so that a procedure may be terminated.

When the prepared tooth exists in the 3D scan data, the margin line of the prepared tooth may be automatically extracted (operation S300).

In addition, when the prepared tooth exists in the 3D scan data, the plurality of 2D images including the prepared tooth and the adjacent tooth adjacent to the prepared tooth may be generated (operation S400).

The 3D temporary prosthesis data is automatically generated based on the plurality of 2D images (operation S500).

The single tooth model corresponding to the prepared tooth is deformed using the margin line and the 3D temporary prosthesis data to generate the 3D prosthesis data (operation S600).

FIG. 9 illustrates a case in which the number of prepared teeth is one in the 3D scan data. When the number of the prepared teeth is not one, operations S300 to S600 may be repeated until the prepared tooth, which is not processed, no longer exists.

According to the present embodiment, the tooth information may be automatically extracted from the 3D scan data, the margin line may be automatically extracted from the partial scan data of the prepared tooth, the 3D temporary prosthesis data may be automatically generated based on the plurality of 2D images of the prepared tooth and the adjacent teeth of the prepared tooth and the single tooth model may be automatically deformed based on the outer point information of the 3D temporary prosthesis data and the margin line to automatically generate the 3D prosthesis data.

In this way, the prosthesis may be automatically generated from the 3D scan data, so that the time and processes of generating the prosthesis may be reduced, and the quality of the prosthesis may be enhanced.

In particular, at least one of operations of automatically extracting the tooth information from the 3D scan data, automatically extracting the margin line from the partial scan data of the prepared tooth and automatically generating the 3D temporary prosthesis data is operated using an artificial intelligence neural network so that the time and processes of generating the prosthesis may be reduced, and the quality of the prosthesis may be enhanced.

According to an embodiment of the present inventive concept, a non-transitory computer-readable storage medium having stored thereon program instructions of the automated method for generating the prosthesis from the 3D scan data may be provided. The above mentioned method may be written as a program executed on the computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned automated method for generating the prosthesis from the 3D scan data may be implemented in a form of a computer-executed computer program or an application which are stored in a storage method.

The present inventive concept is related to the automated method for generating the prosthesis from the 3D scan data and the non-transitory computer-readable storage medium having stored thereon program instructions of the automated method for generating the prosthesis from the 3D scan data. According to the present inventive concept, the time and the effort for generating the prosthesis may be reduced and the accuracy and the productivity of the prosthesis may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. An automated method for generating a prosthesis from a three dimensional ("3D") scan data, the method comprising:

automatically extracting tooth information of a tooth included in the 3D scan data from the 3D scan data;

automatically extracting a margin line of a prepared tooth by (i) extracting a partial scan corresponding to the prepared tooth, (ii) mapping the partial scan into a predetermined 2D space using a transformation matrix, (iii) obtaining a 2D margin line by determining a curvature value from data mapped into the 2D space, and (iv) converting the 2D margin line into a 3D margin line using an inverse of the transformation matrix;

generating a plurality of two dimensional ("2D") images including the prepared tooth and an adjacent tooth adjacent to the prepared tooth including:

a first 2D image including the prepared tooth and a first adjacent tooth of the prepared tooth; and a second 2D image including the prepared tooth and a second adjacent tooth of the prepared tooth, the first and second 2D images having a same center at a center of the prepared tooth and different projection directions;

automatically generating a 3D temporary prosthesis data based on the plurality of 2D images; and deforming a single tooth model corresponding to the prepared tooth using the margin line and the 3D temporary prosthesis data by a least-squares method, a linear system having a Laplacian matrix L of the single tooth model with constraints ($C_{pred}$) to be close to a point set of the 3D temporary prosthesis data ($P_{pros}$), and another constraints ($C_{margin}$) not to exceed a point set of the 3D margin line ($P_{margin}$), to generate a 3D prosthesis data.

2. The method of claim 1, wherein the tooth information comprises a tooth number, whether or not the tooth is prepared, a position of the tooth, and a direction of the tooth.

3. The method of claim 2, wherein the automatically extracting tooth information of the tooth comprises:

pre-processing the 3D scan data to a model input;

obtaining a feature map by inputting the model input to a backbone network; and extracting the tooth information from the feature map.

4. The method of claim 3, wherein a regression loss is used for the position of the tooth and the direction of the tooth and a classification loss is used for the tooth number for learning of the backbone network.

5. The method of claim 1, wherein a conditional generative adversarial network is used in the automatically generating the 3D temporary prosthesis data.

6. The method of claim 5, wherein the conditional generative adversarial network comprises an encoder configured to receive the plurality of 2D images, position information of a camera and direction information of the camera, a latent vector connected to the encoder and a decoder connected to the latent vector, and wherein the decoder is configured to output the 3D temporary prosthesis data.

7. The method of claim 1, wherein the deforming the single tooth model comprises:

aligning the single tooth model to a position of the prepared tooth; and deforming the single tooth model using the margin line as a first constraint and using the 3D temporary prosthesis data as a second constraint.

8. The method of claim 7, wherein when a Laplacian matrix of the single tooth model is L, a point set of the 3D temporary prosthesis data is Ppos, a point set of the margin line is Pmargin, a constraint to be close to Ppos is Cpred, a constraint not to exceed Pmargin is Cmargin, a position of a vertex of the 3D prosthesis data is xopt, $$\begin{bmatrix} L \\ C_{pred} \\ C_{margin} \end{bmatrix} x_{opt} = \begin{bmatrix} 0 \\ P_{pos} \\ P_{margin} \end{bmatrix}$$

is satisfied.

9. The method of claim 1, further comprising:

aligning the 3D scan data to an origin of a predetermined coordinate system in directions of the predetermined coordinate system prior to the automatically extracting the tooth information.

10. The method of claim 1, wherein the automatically extracting the tooth information is operated by a first artificial intelligence neural network, wherein the automatically extracting the margin line is operated by a second artificial intelligence neural network; and wherein the automatically generating the 3D temporary prosthesis data is operated by a third artificial intelligence neural network.

11. An automated method for generating a prosthesis from a three dimensional ("3D") scan data, the method comprising:

automatically extracting tooth information of a tooth included in the 3D scan data from the 3D scan data;

determining whether a prepared tooth exists or not in the 3D scan data from the tooth information;

automatically extracting a margin line of the prepared tooth when the prepared tooth exists in the 3D scan data by (i) extracting a partial scan corresponding to the prepared tooth, (ii) mapping the partial scan into a predetermined 2D space using a transformation matrix, (iii) obtaining a 2D margin line by determining a curvature value from data mapped into the 2D space, and (iv) converting the 2D margin line into a 3D margin line using an inverse of the transformation matrix;

generating a plurality of two dimensional ("2D") images including:

a first 2D image including the prepared tooth and a first adjacent tooth of the prepared tooth; and a second 2D image including the prepared tooth and a second adjacent tooth of the prepared tooth, the first and second 2D images having a same center at a center of the prepared tooth and different projection directions;

automatically generating a 3D temporary prosthesis data based on the plurality of 2D images; and deforming a single tooth model corresponding to the prepared tooth using the margin line and the 3D temporary prosthesis data by a least-squares method, a linear system having a Laplacian matrix L of the single tooth model with constraints ($C_{pred}$) to be close to a point set of the 3D temporary prosthesis data ($P_{pros}$), and another constraints ($C_{margin}$) not to exceed a point set of the 3D margin line ($P_{margin}$), to generate a 3D prosthesis data.to generate a 3D prosthesis data.

12. A non-transitory computer-readable storage medium having stored thereon program instructions, the program instructions executable by at least one hardware processor to:

automatically extract tooth information of a tooth included in a three dimensional ("3D") scan data from the 3D scan data;

automatically extract a margin line of a prepared tooth by (i) extracting a partial scan corresponding to the prepared tooth, (ii) mapping the partial scan into a predetermined 2D space using a transformation matrix, (iii) obtaining a 2D margin line by determining a curvature value from data mapped into the 2D space, and (iv) converting the 2D margin line into a 3D margin line using an inverse of the transformation matrix;

generate a plurality of two dimensional ("2D") images including:

a first 2D image including the prepared tooth and a first adjacent tooth of the prepared tooth; and a second 2D image including the prepared tooth and a second adjacent tooth of the prepared tooth, the first and second 2D images having a same center at a center of the prepared tooth and different projection directions;

automatically generate a 3D temporary prosthesis data based on the plurality of 2D images; and deform a single tooth model corresponding to the prepared tooth using the margin line and the 3D temporary prosthesis data by a least-squares method, a linear system having a Laplacian matrix L of the single tooth model with constraints ($C_{pred}$) to be close to a point set of the 3D temporary prosthesis data ($P_{pros}$), and another constraints ($C_{margin}$) not to exceed a point set of the 3D margin line ($P_{margin}$), to generate a 3D prosthesis data.to generate a 3D prosthesis data.

* * * * *